Figure 1:
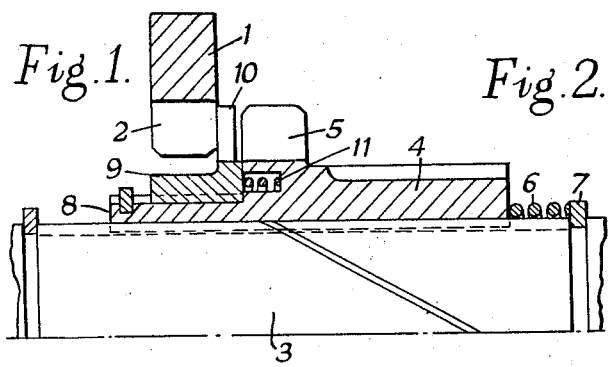

June 30, 1959   H. SINCLAIR   2,892,524
CLUTCHES FOR TRANSMITTING ROTARY MOTION
Filed Aug. 15, 1955   3 Sheets-Sheet 1

INVENTOR
Harold Sinclair
BY
Benjamin Sweedler
ATTORNEY

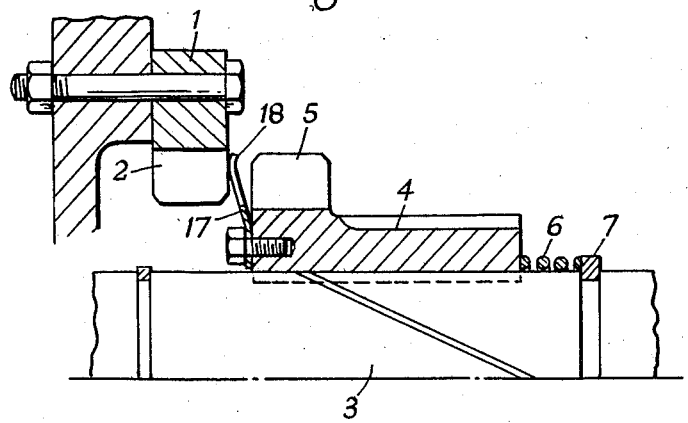
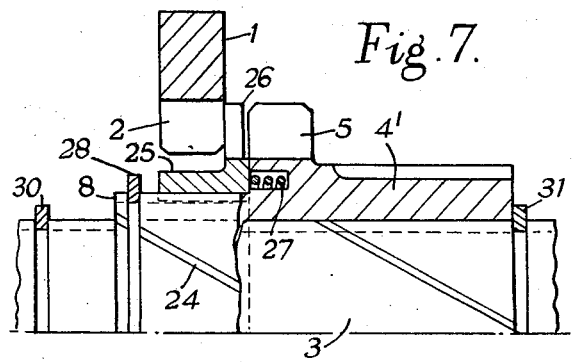

June 30, 1959 H. SINCLAIR 2,892,524
CLUTCHES FOR TRANSMITTING ROTARY MOTION
Filed Aug. 15, 1955 3 Sheets-Sheet 3

INVENTOR
Harold Sinclair
BY
Benjamin Sweedler
ATTORNEY

United States Patent Office 2,892,524
Patented June 30, 1959

2,892,524

CLUTCHES FOR TRANSMITTING ROTARY MOTION

Harold Sinclair, Windsor, England

Application August 15, 1955, Serial No. 528,309

Claims priority, application Great Britain August 20, 1954

8 Claims. (Cl. 192—67)

This invention relates to jaw tooth clutches for transmitting rotary motion, of the synchronous self-shifting type comprising first and second clutch members which are arranged co-axially and the first of which is provided with jaw clutch teeth and on the second of which members is mounted an intermediate member provided with jaw clutch teeth into and out of engagement with the teeth of the first member. The most common means employed in such clutches for the purpose of engaging the clutch comprise one or more pawls, the noses of which move in a radial sense, carried by the first member or the intermediate member. In the over-running or free-wheeling condition of the clutch, the noses of the pawls ratchet under or over projections on the member which does not carry the pawls, i.e., the intermediate or the first member, said projections being, for example, the teeth on the member in question. When the sense of relative angular movement between the first and second members is in the direction for effecting clutch engagement, the pawl or one of the pawls is picked up by one of the said projections and the intermediate member is thereby caused to move helically on the second member whereby to bring its teeth precisely into alignment for clean interengagement with the teeth on the first member.

A clutch of the kind described above incorporating pawls operates very well in practice, except at high angular speeds of the member which carries the pawls. At high angular speeds the centrifugal loading on the pivot pins of the pawls may be such that the friction between the pins and the pawls prevents the pawls from turning freely on their pins, and the pawls become inoperative, leading to failure of the mechanism. A clutch of this kind is also unsuitable for use in cases where the clutch may be required to operate for long periods in the over-running condition with the pawls ratcheting, particularly if at high relative speeds, for example, with the two clutch members rotating in opposite directions.

In accordance with the invention, the means for initiating engagement of the clutch comprise spring or equivalent means (for example, fluid pressure) arranged to effect light nuzzling contact either continuously during periods of over-running or at least prior to the time of engagement, between one of said first and intermediate members on the one hand and the other of said first and intermediate members on the other hand.

In accordance with the invention also, the means for initiating engagement of the clutch comprise spring or equivalent means (for example, fluid pressure) arranged to effect light nuzzling contact either continuously during periods of over-running or at least prior to the time of engagement between one of said first and intermediate members on the one hand and an auxiliary member carried by the other of said first and intermediate members on the other hand, the auxiliary member being of low inertia as compared with the intermediate member.

Figure 2:
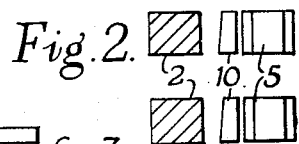
Figure 3:
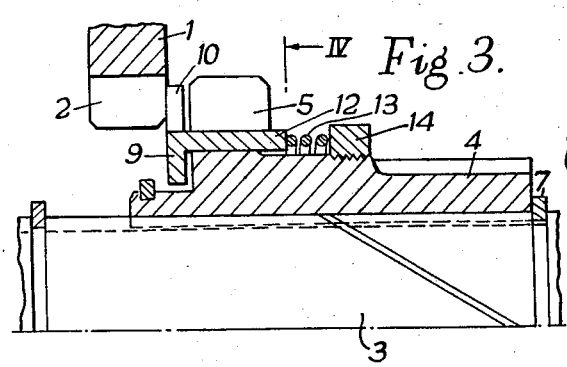
Figure 4:
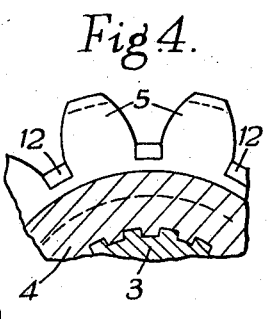

In order that the invention may be clearly understood and readily carried into effect some embodiments thereof will now be described by way of example, with reference to the accompanying drawings, in which Figs. 1, 3, 5, 6, 7, 8 are half-views in longitudinal section of different forms of clutch according to the invention, Fig. 2 is a diagrammatic view of some of the teeth of the jaw clutch teeth and the teeth of an auxiliary member of the clutch shown in Fig. 1, and Fig. 4 is a sectional view on the line IV—IV of Fig. 3.

In one embodiment of the invention, shown in Figs. 1 and 2, the first member 1 is formed with a ring of internal jaw clutch teeth 2 and the second member is a shaft 3 which is coaxial with the first member 1 and is provided with helical splines. The intermediate member 4 is mounted on the shaft 3 and is formed with internal helical splines which are engaged with the splines on the shaft 3 whereby the intermediate member 4 is constrained for helical movement on the shaft 3. The intermediate member 4 is provided with a ring of external jaw clutch teeth 5 capable of engagement with the internal teeth 2 of the first member 1. A helical spring 6 is provided on the shaft 3 between the intermediate member 4 and an axial stop 7 on the shaft 3, the spring 6 being arranged to urge the intermediate member 4 axially in the direction for effecting the initial engagement of the clutch. On the end of the intermediate member 4 nearest to the teeth 2 of the first member 1 there is provided an axial extension 8 which is formed with straight splines and on the said extension 8 is mounted a light ring 9 formed with internal straight splines which co-operate with the splines of the said extension 8 to constrain the ring 9 for axial movement with respect to the intermediate member 4. The ring 9 has a radial outwardly projecting flange in which are formed jaw clutch teeth 10 similar to and substantially in line with the jaw clutch teeth 5 of the intermediate member 4. In the face of the intermediate member 4 which is adjacent to the ring 9 there is formed a recess in which a light compression coil spring 11 is located. In the over-running condition of the clutch the smooth hardened faces of the teeth 10 on the flange of ring 9 ride smoothly over the similar internal teeth 2 of the first member 1. The said co-acting faces of the teeth 10 on the flange and on the first member 1 are preferably flat, or may be provided with a slight chamfer (Fig. 2) and are suitably lubricated. The direction of the slight chamfer is such as to oppose any tendency by the two sets of teeth 2 and 10 to engage under the action of the springs 11 when in the over-running condition.

When synchronism is reached between the first and second members 1 and 3 and the direction of relative rotation tends to reverse, the ring 9 which, as stated, is of low inertia, is moved under the action of the spring 11 in the recess in the intermediate member 4, so that its teeth engage with the internal teeth of the first member sufficiently to effect a driving connection between the teeth 10 on the flange and the teeth 2 in the first member 1, whereupon the intermediate member 4, which is relatively heavy as compared with the ring 9, is drawn along the helical splines of the second member 3 in consequence of the relative rotational movement between the intermediate member 4 and said second member 3, so as to bring the external teeth 5 on said intermediate member 4 into full engagement with the internal teeth 2 of the said first member 1.

In another embodiment of the invention (Figs. 3 and 4) which is a variation of that described above, the above-mentioned ring 9, instead of being splined to the intermediate member 4, is formed with a cylindrical projection which is slotted radially so as to provide a plurality of uniformly spaced teeth 12 which are disposed between and guided axially by the roots of the external teeth 5 on the intermediate member 4. The spring 13 which tends to bring the ring 9 into engagement with the first member 1 is, in this case, disposed between a nut 14 on the intermediate member 4 and the ends of the teeth 12 on the ring 9, and is in the form of a helical spring surrounding the intermediate member 4. The operation of this clutch is similar to the operation of the clutch shown in Figs. 1 and 2.

In a further embodiment of the invention (Fig. 5), a thin spring steel annular plate 15 is bolted to the first member 1 on the side thereof nearest to the intermediate member 4, the plate 15 being provided with teeth 16 which project radially inward and which correspond in shape with and are substantially in alignment with the internal teeth 2 of the first member 1. The teeth 16 on the annular plate 15 are sprung slightly outwards in the axial direction, viz. towards the intermediate member 4, which is urged towards the teeth 16 by a light helical spring 6 which surrounds the shaft 3 and is disposed between the intermediate member 4 and an axial stop 7 on the shaft 3. During over-running the teeth 5 on the intermediate member 4 are in smooth nuzzling contact with the teeth 16 on the annular spring steel plate 15, so that the teeth 16 are pressed slightly towards the internal teeth 2 of the first member 1. When the first and second members 1 and 3 are substantially in synchronism and the sense of relative rotation between them tends to reverse, the teeth 16 on the plate 15 spring axially outwards and engage between the teeth 5 on the intermediate member 4, and in consequence of the said relative rotational motion, initiate movement of the intermediate member 4 along the helical splines towards the first member 1, the movement of the intermediate member 4 into full engagement with the first member 1 being then assured by the action of the teeth 2 of the first member 1 on the teeth 5 of the intermediate member 4. It will be understood that as in the preceding embodiments of the invention, the initial engagement is effected by parts, viz. the spring steel teeth 16 on the annular plate 15, that are of very low inertia as compared with the inertia of the relatively heavy intermediate member 4.

Figure 5:
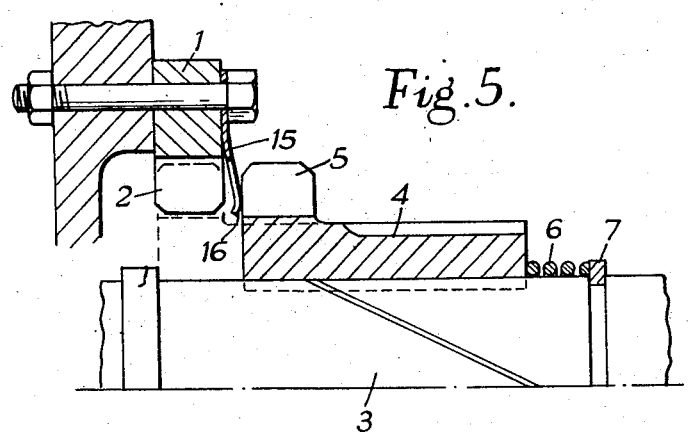

In a variation of the clutch of Fig. 5, a spring steel externally toothed plate 17 is secured to the end of the intermediate member 4 which is nearest to the first member (Fig. 6). The external teeth 18 of the annular plate 17 are similar in shape to and are substantially in alignment with the teeth 5 on the intermediate member 4 and are sprung slightly outwards axially, i.e. in the direction of the first member 1. In other respects, the construction is similar to that of Fig. 5 and the operation is also similar, in that the initial engagement is between the internal teeth 2 of the first member 1 and the teeth 18 on the annular plate 17, which latter teeth 18 are pressed slightly towards the intermediate member 4 during over-running conditions, due to the action of the helical spring 6 disposed between the intermediate member 4 and the axial stop 7.

In both of the last described two embodiments of the invention the teeth on the annular spring steel plate may be very slightly skewed or raked, the direction of inclination being such as to oppose engagement of the teeth on the plate with the co-acting teeth during overrunning conditions.

Fig. 7 shows a clutch having an auxiliary member, which instead of being movable axially with respect to the intermediate member, is constrained to have limited helical movement with respect to the intermediate member so that initial engagement of the teeth of the auxiliary member with the co-operating jaw clutch teeth is followed by screwing of the teeth of the auxiliary member into further engagement with the said co-operating jaw clutch teeth.

Referring to Fig. 7, the intermediate member 4 is formed with external helical splines 24 that are of the same hand as the splines on shaft 3, and which may be of the same pitch as the last-mentioned splines or of different pitch. The auxiliary member is in the form of a ring 25 of low inertia as compared with the intermediate member 4 and is formed with internal helical splines that co-operate with the said external helical splines 24 on the intermediate member 4, so that the ring 25 is constrained to move helically on the intermediate member 4. The ring 25 is formed with a set of jaw clutch teeth 26 that are capable of engaging with the internal jaw clutch teeth 2 of the first clutch member 1. A light spring 27 is provided for resiliently urging the light auxiliary member 25 in the direction of the first member 1, and a stop 28 is provided for limiting the axial travel of the auxiliary member 25.

In operation, assuming that the sense of relative rotation of the clutch member 1 and shaft 3 is such as to provide clutch disengagement, the teeth 26 on the auxiliary member 25 are in light nuzzling contact, under the action of the spring 27, with the internal teeth 2 of the clutch member 1. When the relative rotation is reversed, the first effect is that in the instant after synchronism the teeth 26 of the auxiliary member 25 are urged into partial engagement with the internal jaw clutch teeth 2 by the spring 27 and thereafter, when relative rotation in the new sense continues, the auxiliary member 25 is screwed along the intermediate member 4 until its teeth 26 are in full engagement with the internal jaw clutch teeth 2 by the spring 27 and thereafter, when relative rotation in the new sense continues, the auxiliary member 25 is screwed along the intermediate member 4 until its teeth 26 are in full engagement with the internal jaw clutch teeth 2, and further screwing of the auxiliary member 25 along the intermediate member 4 is prevented by the axial stop 28. The teeth 26 on the auxiliary member 25 are now axially aligned with the teeth on the intermediate member 4. Continued relative rotation of the member 1 and shaft 3 in the new sense causes the intermediate member 4 to screw along the shaft to bring its teeth 5 into clutching engagement with the teeth 2 of the clutch member 1, this movement of the intermediate member 4 causing the auxiliary member 25 to move axially until, when the teeth of the intermediate member 4 are fully engaged with the teeth 2 of the clutch member 1, the teeth 26 of the auxiliary member 4 have been disengaged from the teeth 2. Further axial movement of the intermediate member 4 is prevented by an axial stop 30 and the member 1 and shaft 3 are now clutched together for the transmission of torque from the member 1 to the shaft 3 via the intermediate member 4.

When the sense of relative rotation again reverses, the intermediate member 4 screws back along the shaft 3, bringing its teeth 5 out of engagement with the teeth 2 and bringing the teeth 26 of the auxiliary member 25 into engagement with the teeth 2; when the axial movement of the intermediate member is halted by stop 31, the auxiliary member 25 is screwed along the intermediate member 4, compressing the springs 27, so as to bring its teeth 26 out of engagement with the teeth 2 to an axial position in which light nuzzling contact is resumed between the teeth 26 and 2.

Figure 8:
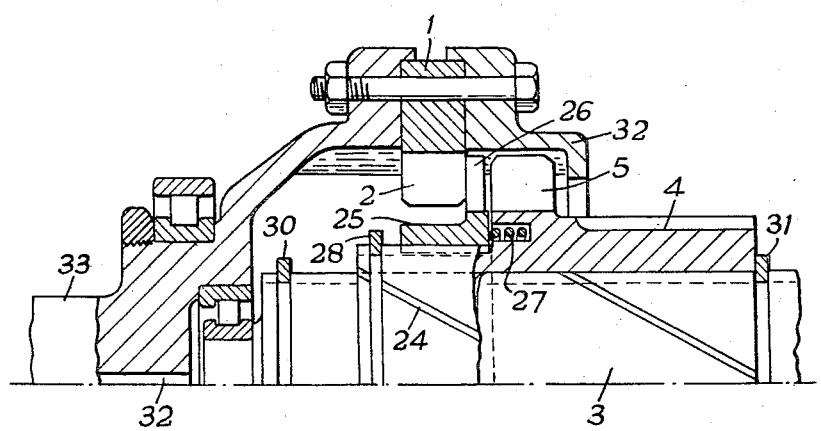

Fig. 8 shows an embodiment of the type of clutch shown in Fig. 7 wherein an additional feature is provided, viz. a casing 32 fixed to the toothed clutch ring 1, to form an annular reservoir to retain a ring of lubricating oil fed through an inlet duct 32 in the shaft 33. The ring of oil exerts a tangential drag force upon the auxiliary clutch member 25 which is mounted on the helical splines 24 and consequently the drag force opposes the spring 27 and reduces the light nuzzling contact between the clutch teeth 2 and the teeth 26 when there is relative rotation between the said clutch teeth. The drag force decreases when the relative speed falls to zero when synchronism is reached between the clutch members, and consequently the spring 27 is then fully effective in initiating engagement between clutch teeth 26 and 2. An advantageous feature of the tangential drag force due to the ring of lubricating oil derived by the construction in Fig. 8 is that at high relative rotational speeds the auxiliary member 25 is moved against the compression of the light spring 27 out of nuzzling contact with the clutch teeth 2. This feature can be applied to the other clutch constructions illustrated herein as a means of reducing or removing the nuzzling contact between the clutch teeth at high relative speeds.

I claim:

1. A synchronous self-shifting clutch comprising a first toothed rotary clutch member, a second rotary clutch member mounted coaxially with said first clutch member, a toothed intermediate member provided with jaw clutch teeth and constrained to move helically relatively to said second clutch member into and out of toothed engagement with said first clutch member, an auxiliary member carried by one of said first and intermediate members, teeth on said auxiliary member adapted to engage with the teeth of the other of said intermediate and first members, which auxiliary member is disposed so that in the disengaged condition of the clutch the teeth of said auxiliary member are closer to the other of said first and intermediate members than the teeth of the member by which it is carried, said auxiliary member being of low inertia as compared with said intermediate member, and resilient means urging said auxiliary member towards the said other of said first and intermediate members.

2. A synchronous self-shifting clutch according to claim 1 including projections on said auxiliary member that extend between the teeth of the member by which it is carried, to constrain said auxiliary member for movement axially of the clutch with respect to the member by which it is carried.

3. A synchronous self-shifting clutch comprising a first toothed rotary clutch member, a second rotary clutch member mounted coaxially with said first clutch member, a toothed intermediate member provided with jaw clutch teeth and constrained to move helically relatively to said second clutch member into and out of toothed engagement with said first clutch member, an auxiliary member carried by one of said first and intermediate members, teeth on said auxiliary member adapted to engage with coacting teeth on the other of said intermediate and first members, said auxiliary member being of low inertia as compared with said intermediate member, and resilient means urging said auxiliary member towards the said coacting teeth on the other of said first and intermediate members.

4. A synchronous self-shifting clutch according to claim 3 including projections on said auxiliary member that extend between the teeth of the member by which it is carried, to constrain said auxiliary member for movement axially of the clutch with respect to the member by which it is carried.

5. A synchronous self-shifting clutch according to claim 3, wherein said teeth on said auxiliary member are resilient teeth which are in alignment with the teeth of that one of the first and intermediate members that carries said auxiliary member and which project towards the other of said first and intermediate members in the axial direction of the clutch.

6. A synchronous self-shifting clutch according to claim 3, wherein said auxiliary member is carried by said intermediate member, the clutch including means constraining said auxiliary member for limited helical movement relative to said intermediate member, the helical movement of said auxiliary member relative to said intermediate member being of the same hand as the helical movement of said intermediate member relative to said second clutch member.

7. A synchronous self-shifting clutch according to claim 3, wherein said auxiliary member is carried by said intermediate member with the teeth of said auxiliary member, in the disengaged condition of the clutch, nearer to the teeth of said first member than are the teeth of said intermediate member, the clutch including means constraining said auxiliary member for limited helical movement relative to said intermediate member, the helical movement of said auxiliary member relative to said intermediate member being of the same hand as the helical movement of said intermediate member relative to said second clutch member.

8. A synchronous self-shifting clutch according to claim 3, wherein said auxiliary member is carried by said intermediate member with the teeth of said auxiliary member, in the disengaged condition of the clutch, nearer to the teeth of said first member than are the teeth of said intermediate member, the clutch including means constraining said auxiliary member for limiting helical movement relative to said intermediate member, the helical movement of said auxiliary member relative to said intermediate member being of the same hand as the helical movement of said intermediate member relative to said second clutch member, and said first clutch member being shaped to provide an annular cavity whereby during rotation of said first clutch member a ring of liquid can be formed in said cavity, at least a part of said auxiliary member projecting into said cavity so that with the clutch disengaged the dragging action of said ring of liquid on said auxiliary member is opposed to the action of said resilient means.

References Cited in the file of this patent

UNITED STATES PATENTS

| | | |
|---|---|---|
| 2,076,362 | Boldt et al. | Apr. 6, 1937 |
| 2,110,964 | Ridgeway | Mar. 15, 1938 |

FOREIGN PATENTS

| | | |
|---|---|---|
| 71,865 | Sweden | May 19, 1931 |
| 134,908 | Sweden | Mar. 18, 1952 |